(12) United States Patent
Ma et al.

(10) Patent No.: US 7,304,915 B2
(45) Date of Patent: Dec. 4, 2007

(54) ACTUATOR FOR OPTICAL DISK SYSTEM AND APPARATUS FOR PROVIDING SIGNAL FOR DRIVING THE ACTUATOR

(75) Inventors: Byung-In Ma, Suwon-si (KR);
Kwan-Joon Kim, Hwaseong-gun (KR);
Seok-Jung Kim, Suwon-si (KR);
Shi-yang Ryu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 530 days.

(21) Appl. No.: 10/746,290

(22) Filed: Dec. 29, 2003

(65) Prior Publication Data

US 2004/0208091 A1 Oct. 21, 2004

(30) Foreign Application Priority Data

Dec. 30, 2002 (KR) .................. 10-2002-0087331
Dec. 10, 2003 (KR) .................. 10-2003-0089366

(51) Int. Cl.
*G11B 5/58* (2006.01)
*G11B 7/00* (2006.01)

(52) U.S. Cl. .................. 369/44.11; 369/44.15; 369/53.19; 359/824

(58) Field of Classification Search ............ None
See application file for complete search history.

(56) References Cited

U.S. PATENT DOCUMENTS 4,556,291 A * 12/1985 Chen .................. 359/282
5,905,255 A * 5/1999 Wakabayashi et al. ... 250/201.5
2002/0006091 A1 * 1/2002 Ma et al. .................. 369/44.35
2003/0039185 A1   2/2003 Ikawa et al.
2003/0072224 A1 * 4/2003 Ando .................. 369/44.26

FOREIGN PATENT DOCUMENTS

| JP | 2001-266394 | 9/2001 |
| JP | 2001-325739 | 11/2001 |
| JP | 2002-150584 | 5/2002 |
| WO | WO 03/088220 A1 | 10/2003 |

OTHER PUBLICATIONS

Search Report issued in European Patent Application No. 03258229.8 on Mar. 8, 2007.

* cited by examiner

*Primary Examiner*—William R. Korzuch
*Assistant Examiner*—Tawfik Goma
(74) *Attorney, Agent, or Firm*—Stein, McEwen & Bui, LLP

(57) ABSTRACT

An actuator of an optical disk system and an apparatus producing a signal for driving the actuator, the actuator including a light source, with which information is recorded on or reproduced from an optical disk surface. In the actuator, an inner focusing coil and an outer focusing coil are installed near an inner boundary and an outer boundary, respectively, of the optical disk surface. A first signal wire is connected to a first port of the inner focusing coil and transmits an inner coil signal. A second signal wire is connected to a first port of the outer focusing coil and transmits an outer coil signal. A common signal wire is connected to a second port of the inner focusing coil and a second port of the outer focusing coil and transmits a common reference signal. Thus, a simple, inexpensive 8-wire actuator can be obtained.

13 Claims, 7 Drawing Sheets

ACTUATOR FOR OPTICAL DISK SYSTEM AND APPARATUS FOR PROVIDING SIGNAL FOR DRIVING THE ACTUATOR

CROSS-REFERENCE TO RELATED APPLICATIONS

This application claims the benefit of Korean Patent Application Nos. 2002-87331 and 2003-89366, filed Dec. 30, 2002, and Dec. 10, 2003, respectively, in the Korean Intellectual Property Office, the disclosures of which are incorporated herein in their entireties by reference.

BACKGROUND OF THE INVENTION

1. Field of the Invention

The present invention relates to an apparatus which records information on, or reproduces information from a recording medium, and more particularly, to an actuator of an optical disc system and an apparatus for providing a signal for driving the actuator.

2. Description of the Related Art

Optical disk systems have a light source to record information on an optical disk, which is a recording medium, or reproduce information from the optical disk. The light source requires an actuator for moving a light source over an optical disk.

FIG. 1 is a perspective view of an actuator for an optical disk system. Referring to FIG. 1, the actuator includes a light source and has a width of about 10 mm. The actuator is about 10 mm since a compact disc (CD), a digital versatile disc (DVD), or the like used as an optical disk has a diameter of about 12 cm and a thickness of about 0.1 to 1.2 mm and the light source for recording or reproducing information to or from the optical disk produces light with a wavelength of 405 to 780 nm.

FIG. 2 is a partial cross-section of an actuator for an optical disk system of FIG. 1. Referring to FIG. 2, an operating unit of the actuator includes an objective lens 10 and a liquid crystal (LC) panel 20 and is supported by four suspension wires 40.

The four suspension wires 40 support the operating unit as described above and also deliver a driving signal to a focusing coil 50 and to a tracking coil 60, which drive the operating unit in the focusing direction and the tracking direction, respectively. Also, the actuator of FIG. 2 receives a signal supplied to the LC panel 20 from a driving signal supplying device. The driving signal supplied to the focusing and tracking coils 50 and 60 and the signal supplied to the LC panel 20 are combined before being transmitted through each of the suspension wires 40. The combined signal is separated into the two original signals in the operating unit of the actuator of FIG. 2. The actuator of FIG. 2 requires a demodulator 30 to separate the combined signal.

FIG. 3 is a circuit diagram of the actuator of FIG. 2. Referring to FIG. 3, when the actuator of FIG. 2 receives a current Fcs for driving the focusing coil 50 and a current Trk for driving the tracking coil 60 via the four suspension wires 40, an LC panel driving signal LC1 is added to the current Fcs and an LC panel driving signal LC2 is added to the current Trk. The LC panel driving signals LC1 and LC2 each have a burst frequency of 2 kHz. The demodulator filters off a carrier signal with a frequency of 1 MHz from the received signals to produce square-wave signals 1 and 2, which are used for driving the LC panel 20. Spherical aberration can be corrected using the LC panel 20 by changing the amplitudes of the square-wave signals 1 and 2 or changing the amplitude of a tone-burst wave of the square-wave signals 1 and 2.

The spherical aberration correction can be achieved by using a conventional actuator that includes four suspension wires but requires an extra demodulator chip to which conductive wires coming out of an LC panel are coupled. Also, conductive wires coming out of the demodulator chip must be coupled to the four suspension wires, and the coil driving currents Fcs and Trk and the LC panel driving signals LC1 and LC2 may interfere with one another.

Thus, an optical disk system with a reduced number of suspension wires required for delivering separate driving signals to an actuator without using a demodulator is required.

SUMMARY OF THE INVENTION

The present invention provides an actuator of an optical disk system, having a reduced number of suspension wires used to drive coils included in the actuator without using an extra demodulator, and an apparatus that produces a signal for driving the actuator.

According to an aspect of the present invention, there is provided an actuator of an optical disk system, including a light source, with which information is recorded on or reproduced from an optical disk surface. The actuator comprises an inner focusing coil located near an inner boundary of the optical disk surface, an outer focusing coil located near an outer boundary of the optical disk surface, a first signal wire connected to a first port of the inner focusing coil, which transmits an inner coil signal, a second signal wire connected to a first port of the outer focusing coil, which transmits an outer coil signal, and a common signal wire connected to a second port of the inner focusing coil and a second port of the outer focusing coil, which transmits a common reference signal.

According to another aspect of the present invention, there is provided an apparatus that produces and provides a signal for driving an actuator which includes a light source, with which information is recorded on or reproduced from an optical disk surface. The apparatus comprises a first signal producer, which produces an inner coil signal that is transmitted to a first port of an inner focusing coil of the actuator, a second signal producer, which produces an outer coil signal that is transmitted to a first port of an outer focusing coil of the actuator, and a third signal producer, which produces a common reference signal that is transmitted to both a second port of the inner focusing coil and a second port of the outer focusing coil.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
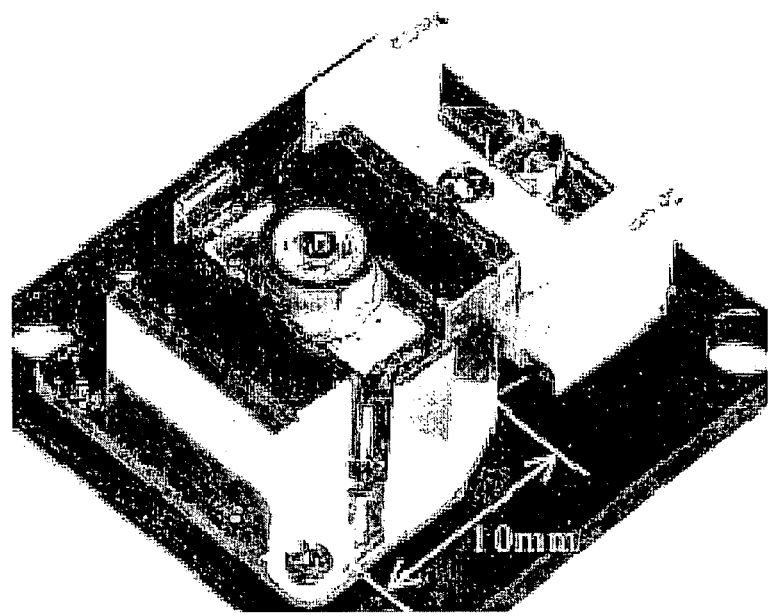
FIG. 1 is a perspective view of an actuator for an optical disk system.
Figure 2:
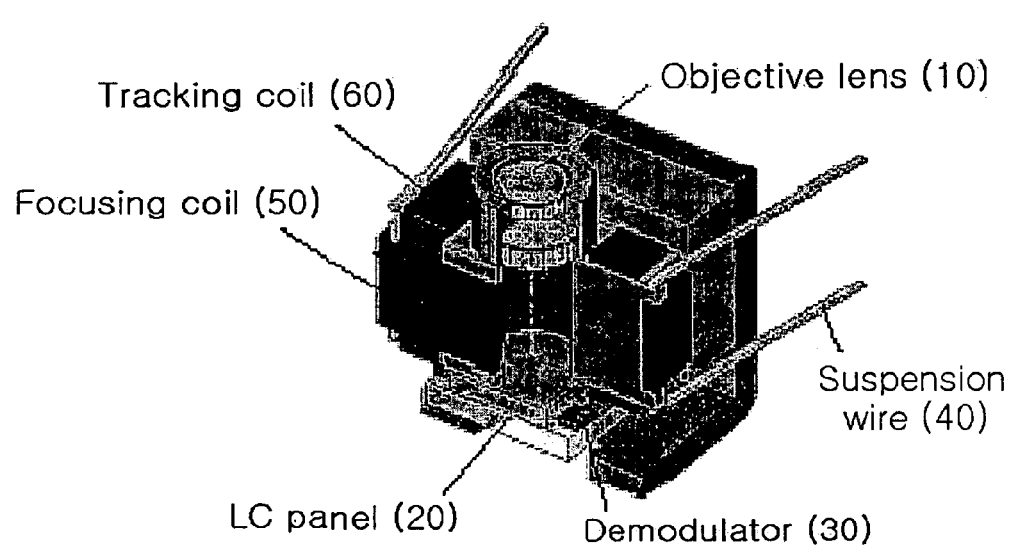
FIG. 2 is a partial cross-section of an actuator for an optical disk system of FIG. 1.
Figure 3:
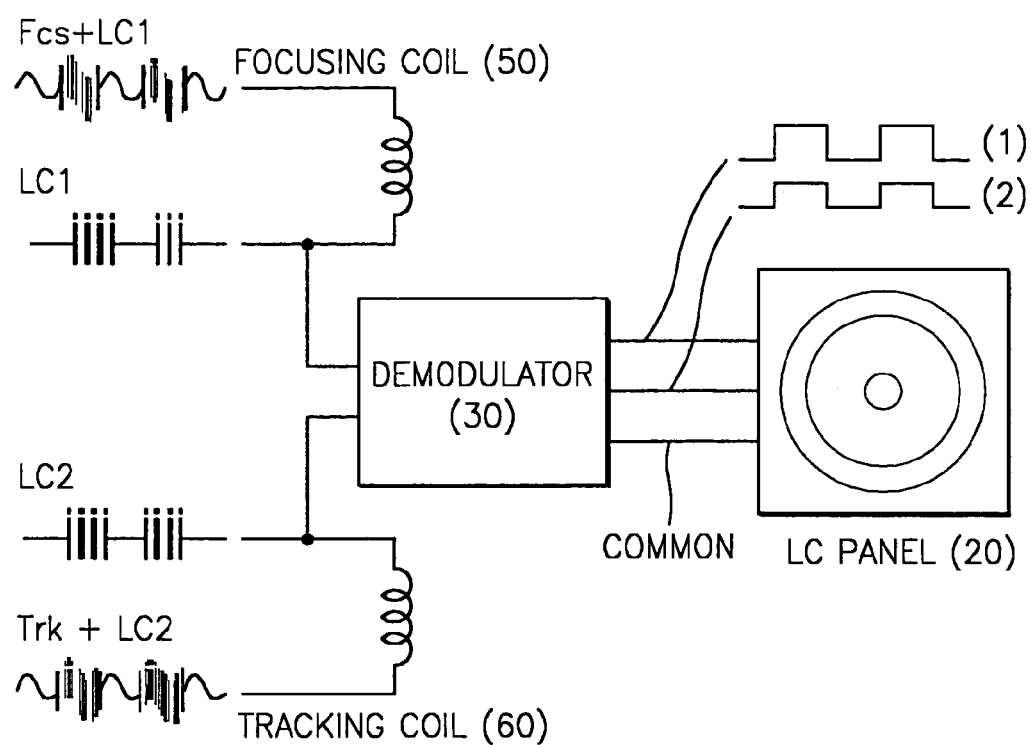
FIG. 3 is a circuit diagram of the actuator of FIG. 2.

Reference will now be made in detail to the embodiments of the present invention, examples of which are illustrated in the accompanying drawings, wherein like reference numerals refer to the like elements throughout. The embodiments are described below to explain the present invention by referring to the figures.

An actuator for a recordable or reproducible optical disk apparatus includes a liquid crystal (LC) panel and performs a tilt function, a focusing function, and a tracking function. An operating unit of the actuator includes components for performing these functions. The present invention enables a reduction in the number of signals wires (i.e., suspension wires) required to provide signals to the components of the actuator.

An actuator for an optical disk system according to the present invention and an apparatus that produces a driving signal for the actuator will now be described in detail with reference to the accompanying drawings.

Figure 4:
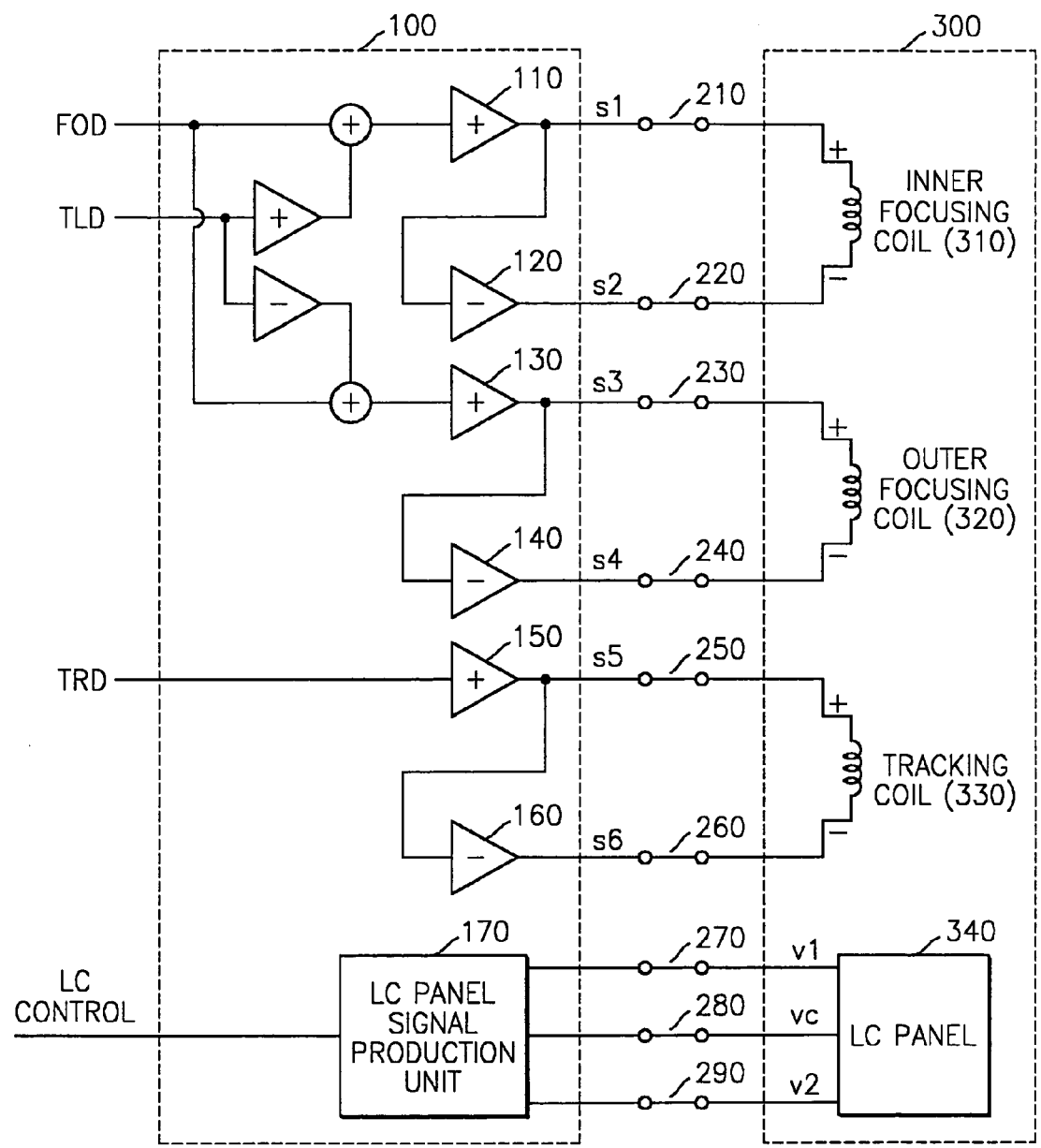
FIG. 4 is a block diagram of a three-axis driving actuator and an apparatus that produces a driving signal for the three-axis driving actuator.

FIG. 4 is a block diagram of a three-axis driving actuator 300 and an apparatus 100 that produces a driving signal for the three-axis driving actuator 300. Referring to FIG. 4, the three-axis driving actuator 300 includes inner and outer focusing coils 310 and 320 and a tracking coil 330. The inner and outer focusing coils 310 and 320 drive an objective lens (OL) (not shown) to be accurately focused on a data layer of a disc. The tracking coil 330 moves a light source, which emits a laser beam, in a radial direction of the disc.

Also, the actuator 300 performs a tilt function, which tilts the light source to compensate for a tilt of the disc. The tilt function is performed using the inner and outer focusing coils 310 and 320.

The inner focusing coil 310 is located near an inner boundary of the disc and drives the OL closer to or farther from the disc surface. The outer focusing coil 320 is located near an outer boundary of the disc and drives the OL closer to or farther from the disc surface. If the inner and outer focusing coils 310 and 320 are simultaneously driven by an identical signal, the OL moves closer to or farther from the disc surface while remaining horizontal. That is, the OL is not tilted toward the inner or outer boundaries of the disc. The signal supplied to move the actuator closer to or farther from the disc surface is referred to as a focusing signal.

On the other hand, if signals with identical magnitudes but opposite polarities are applied to the inner and outer focusing coils 310 and 320, one of the inner and outer focusing coils 310 and 320 drives the actuator 300 closer to the disc surface, and the other drives the actuator 300 farther from the disc surface so that the OL is tilted toward the inner or outer boundary of the disc. The OL is tilted to compensate for a tilt of the disc, which is called a tilt function. A signal for controlling the tilt function is referred to as a tilt signal.

Signals applied to the inner and outer focusing coils 310 and 320 will now be described with reference to FIG. 4. In FIG. 4, s1=FOD+TLD, s2=−s1, s3=FOD−TLD, and s4=−s3. A potential difference across the inner focusing coil 310 is s1−s2=s1−(−s1)=2*s1=2*(FOD+TLD). A potential difference across the outer focusing coil 320 is s3−s4=s3−(−s3)=2*s3=2*(FOD−TLD).

If an input signal TLD is 0, the potential across each of the inner and outer focusing coils 310 and 320 is 2*FOD. Thus, an input signal FOD is a focusing signal.

If the input signal FOD is 0, the potential across the inner focusing coil 310 is 2*TLD, and the potential across the outer focusing coil 320 is −2*TLD. Hence, the inner and outer focusing coils 310 and 320 are driven in opposite directions by the input signal TLD, and the input signal TLD is a tilt signal.

If neither of the input signals FOD and TLD are 0 and the input signal TLD has a positive value, the inner focusing coil 310 moves more than the outer focusing coil 320. Hence, the actuator moves closer to the inner boundary of the disc than the outer boundary of the disk, thereby tilting the OL toward the outer boundary of the disc.

Recording capacities of optical disk storage media have continuously increased with 650 MB CDs, used mainly for storing music data, 4.7 GB DVDs, used mainly for storing moving picture data, and next-generation 25 GB DVDs, capable of recording and reproducing long periods of high definition (HD) broadcasting.

CDs have a diameter of 12 cm and a thickness of 1.2 mm, and use a laser beam with a wavelength of 780 nm and an OL with a numerical aperture (NA) of 0.45.

DVDs have a diameter of 12 cm and a thickness of 0.6 mm, and use a laser beam with a wavelength of 650 nm and an OL with an NA of 0.6.

Next-generation DVDs have a diameter of 12 cm and a thickness of 0.1 mm, use a laser beam with a wavelength of 405 nm and an OL with an NA of 0.85.

In next-generation DVDs, the allowable thickness deviation range of the disc depending on the wavelength of a laser beam and the NA of an OL is very narrow. Hence, even if the thickness of the disc is slightly deviated from the allowable thickness range, the quality of a recording or reproducing signal is greatly degraded, which results in the requirement of an LC panel 340 to compensate for a thickness deviation.

The LC panel 340 is located in the operating unit of the actuator 300, which includes the OL, and effectively compensates for a thickness deviation of a disc.

Figure 5A:
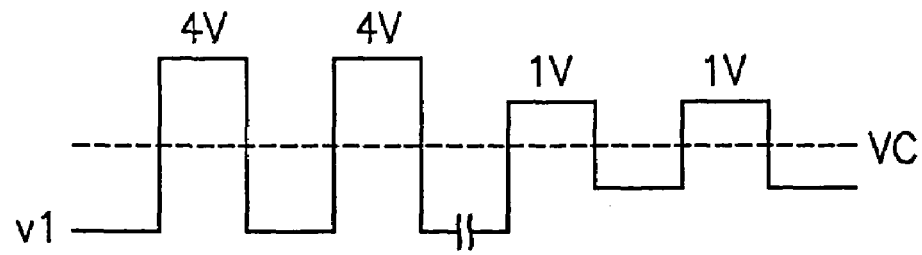
FIGS. 5A and 5B illustrate a driving signal applied to a liquid crystal panel compensating for a thickness deviation of a disc.
Figure 5B:
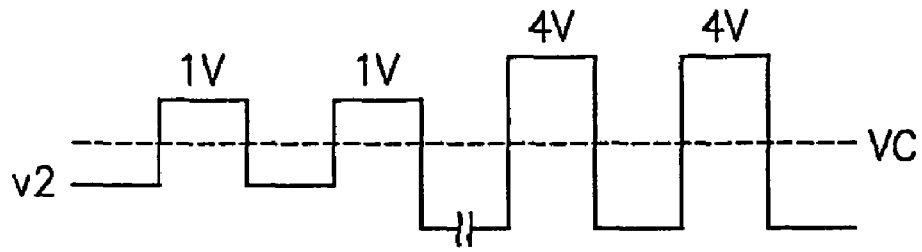

FIGS. 5A and 5B illustrate a driving signal applied to the LC panel 340 for thickness compensation. Referring to FIGS. 5A and 5B, driving signals v1 and v2 and a common signal VC are provided to the LC panel 340. The driving signals v1 and v2 have identical frequencies but different amplitudes.

The driving signals v1 and v2 have different amplitudes relative to the common signal vc. If the amplitudes of the driving signals v1 and v2 are 4V and 1V, respectively, then the intensity of the driving signal v1 is greater than that of the driving signal v2. Hence, the LC panel 340 can compensate for a first predetermined thickness deviation of a disc.

If the amplitudes of the driving signals v1 and v2 are 1V and 4V, respectively, then the intensity of the driving signal v2 is greater than that of the driving signal v1. Hence, the LC panel 340 can compensate for a second predetermined thickness deviation of the disc that is in the opposite direction of the first predetermined thickness deviation.

Referring to FIG. 4, a total of 9 signals are required to drive the actuator 300, which includes the inner focusing coil 310, the outer focusing coil 320, the tracking coil 330, and the LC panel 340. Signal connection wires 210 through 290 are disposed between the apparatus 100 and the actuator 300 and support the actuator 300 and provide the driving signals. In FIG. 4, 9 signal connection wires are required because the number of signal ports is 9. This wire structure is referred to as a 9-wire structure. The actuator is designed to have a good response to a high frequency of several tens of kHz. To achieve this, it is preferable that the actuator has a symmetrical wire structure. However, the 9 signal connection wires cannot be arranged symmetrically, thus requiring a dummy wire to obtain a 10-wire structure.

Figure 7:
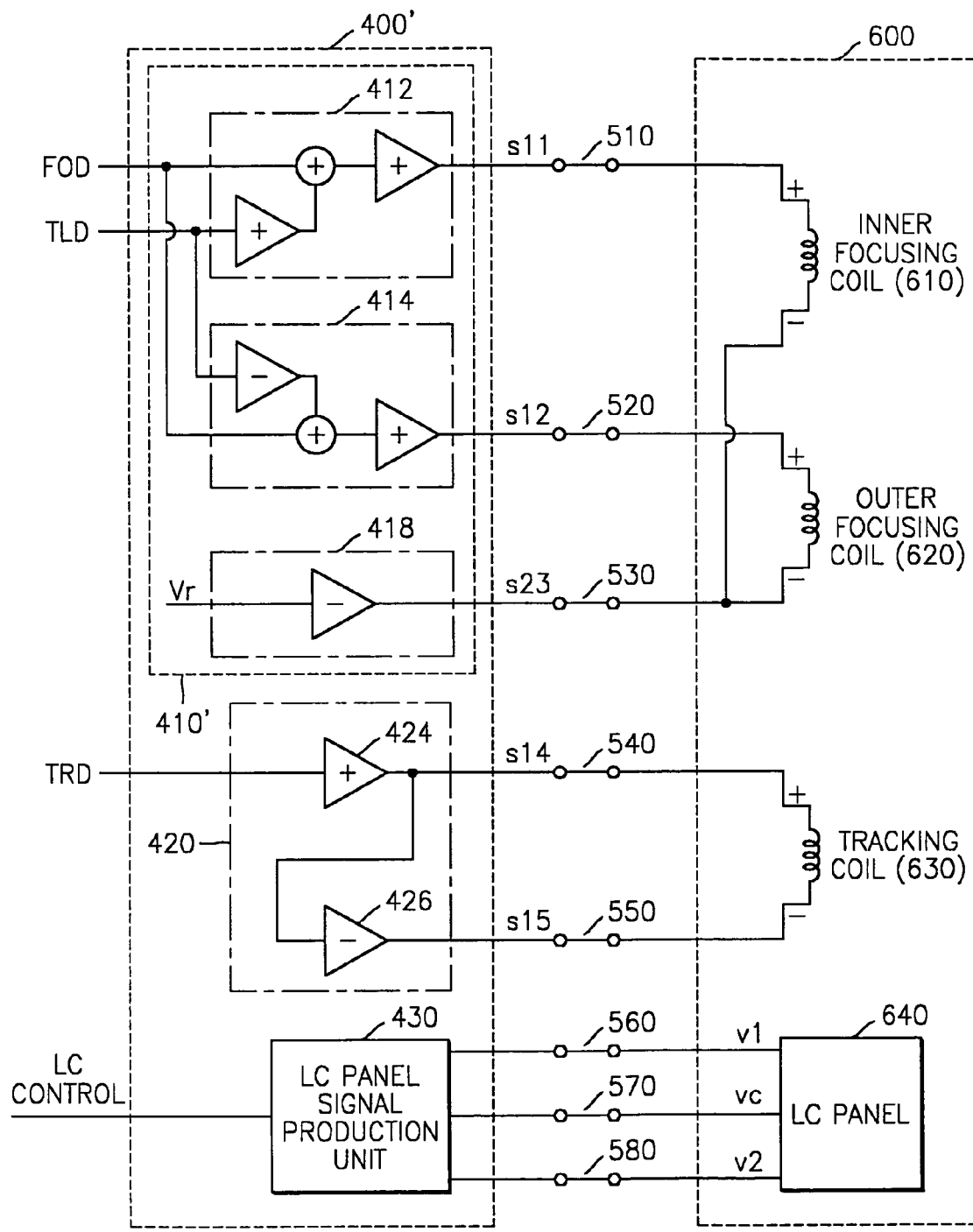
FIG. 7 is a block diagram of the actuator of FIG. 6 and an apparatus that produces a driving signal for the actuator according to another embodiment of the present invention.
Figure 8:
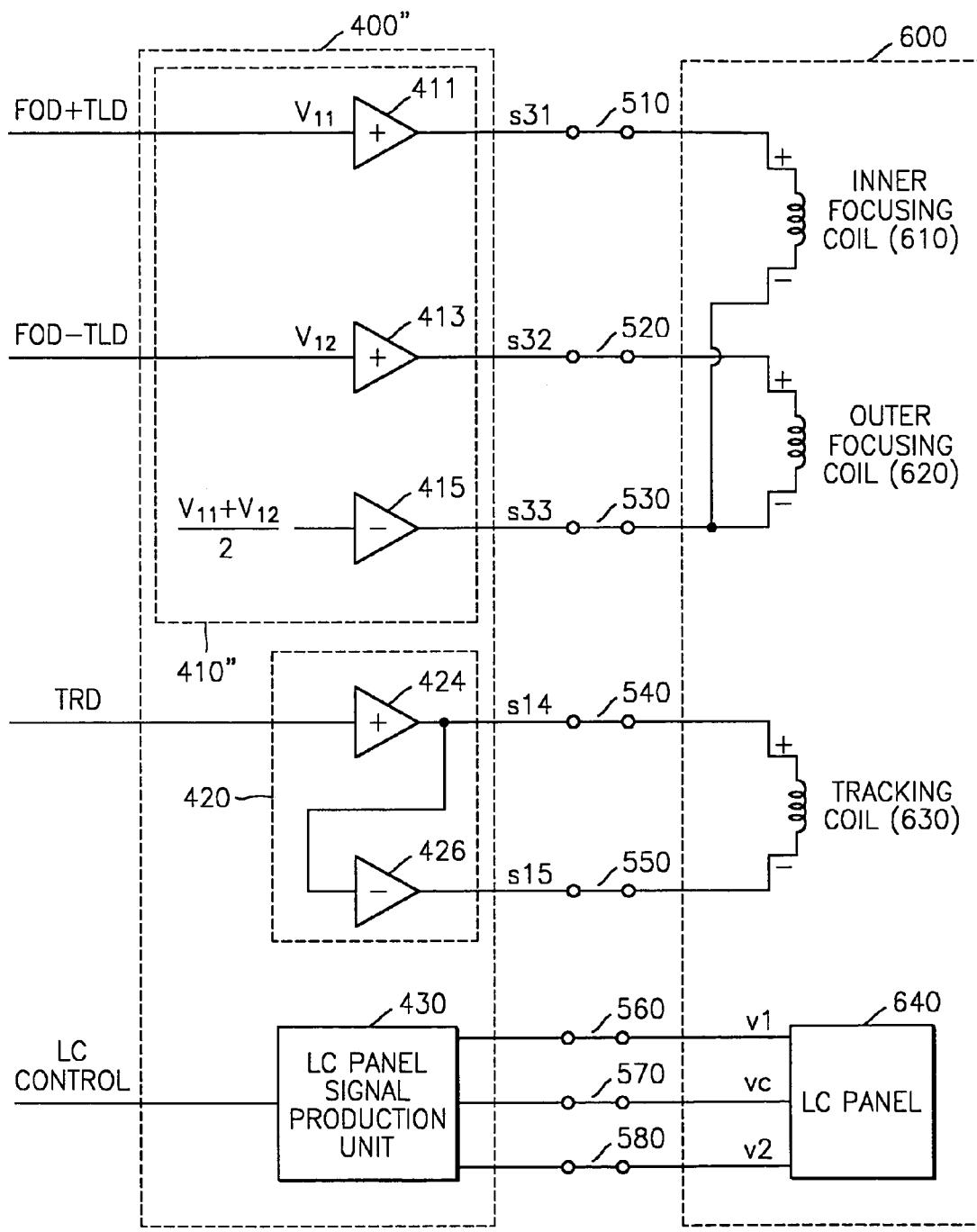
FIG. 8 is a block diagram of the actuator of FIG. 6 and an apparatus that produces a driving signal for the actuator according to another embodiment of the present invention.

However, the increase of the number of suspension wires connected to an operating unit of the actuator complicates the design of the actuator and worsens the operation of the actuator. Accordingly, it is preferable to reduce the number of signal wires. Thus, an actuator according to the present invention as shown in FIGS. 6, 7, and 8 can perform four functions (i.e., a focusing function, a tilt function, a tracking function, and a thickness deviation compensation function) using only 8 signal wires instead of 9 signal wires that require the 10-wire structure.

Figure 6:
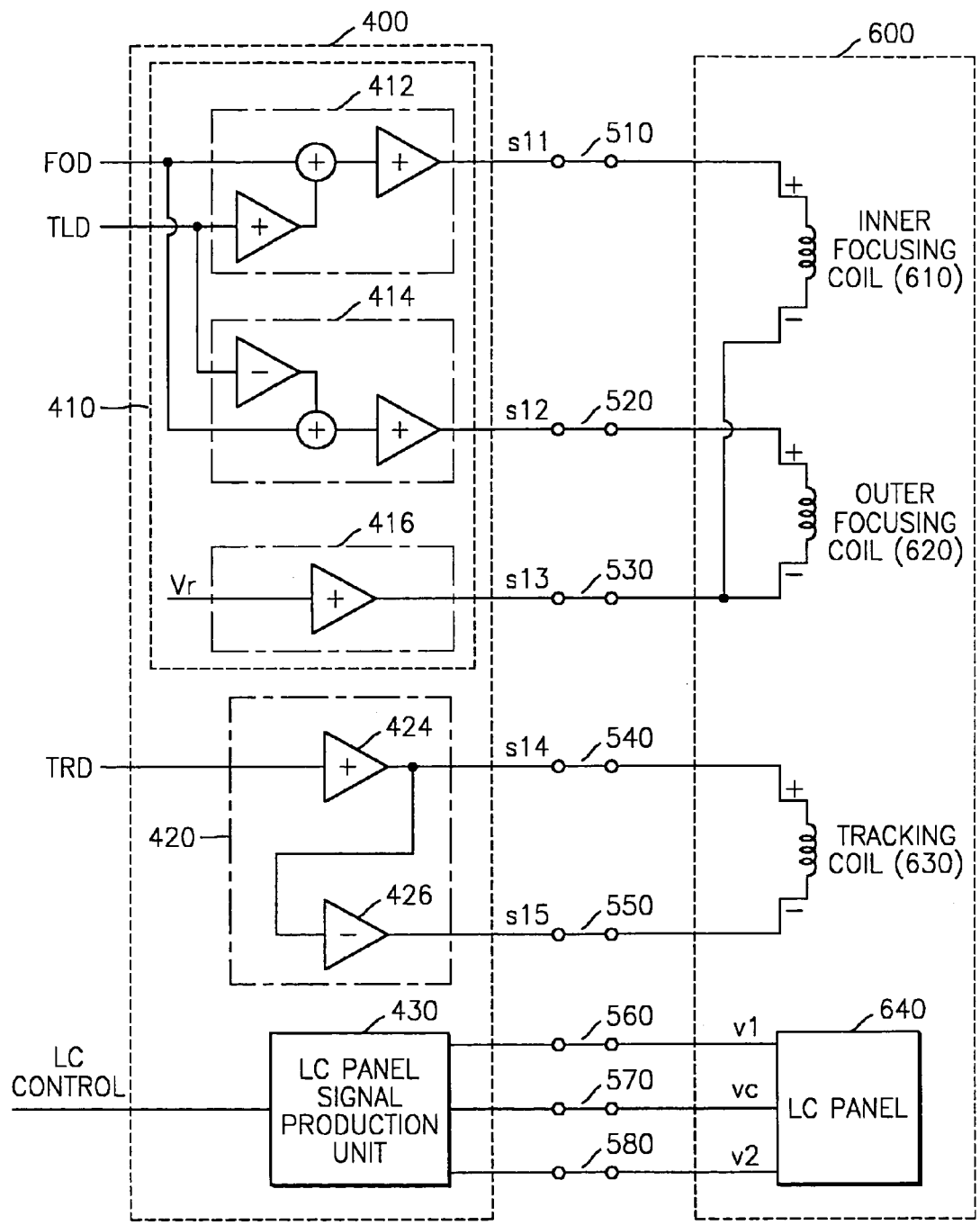
FIG. 6 is a block diagram of an actuator of an optical disk system according to an embodiment of the present invention and an apparatus that produces a signal for driving the actuator according to another embodiment of the present invention.

FIG. 6 is a block diagram of an actuator 600 and an apparatus 400 that produces a driving signal for the actuator 600 according to an embodiment of the present invention. Referring to FIG. 6, the actuator 600 includes an inner focusing coil 610, an outer focusing coil 620, a tracking coil 630, an LC panel 640, and signal connection wires 510 through 580. The signal connection wires 510 through 580 support the actuator 600 and also transmit driving signals to the above components of the actuator 600.

The apparatus 400 includes a focusing coil signal production unit 410, a tracking coil signal production unit 420, and an LC panel signal production unit 430. The inner and outer focusing coils 610 and 620 perform a focusing function and a tilt function. The tracking coil 630 performs a tracking function by moving an actuator across the optical disk surface in a radial direction of the optical disk. The LC panel 640 compensates for a thickness deviation of the optical disk.

In the actuator 600, one port of the inner focusing coil 610 and one port of the outer focusing coil 620 are coupled to a signal wire 530. Hence, only three signal wires are required to drive the inner and outer focusing wires 610 and 620. In other words, in the actuator 600, signals are provided to two ports of the four signal ports of the inner and outer focusing coils 610 and 620 via a single signal wire. As a result, the number of signal connection wires used by the actuator 600 is less than the number of signal connection wires used by the actuator 300.

Referring to FIG. 6, the focusing coil signal production unit 410 includes a first signal producer 412, which produces an inner coil signal s11 that is supplied to a first port of the inner focusing coil 610, a second signal producer 414, which produces an outer coil signal s12 that is supplied to a first port of the outer focusing coil 620, and a third signal producer 416, which produces a common reference signal s13 that is transmitted to both a second port of the inner focusing coil 610 and a second port of the outer focusing coil 620.

The first signal producer 412 sums input signals FOD and TLD and outputs the inner coil signal s11 to a signal wire 510 connected to the first port of the inner focusing coil 610.

The second signal producer 414 subtracts the input signal TLD from the input signal FOD and outputs the outer coil signal s12 to a signal wire 520 connected to the first port of the outer focusing coil 620.

Preferably, the common reference signal s13 is a 0V signal, that is, a ground voltage, or has a half of the value of a power supply voltage. If 12V is used as a power supply voltage, the common reference signal s13 can have 6V.

The inner coil signal s11=FOD+TLD, the outer coil signal s12=FOD−TLD, and the common reference signal s13=Vr. A potential difference, s11−s13, across the inner focusing coil 610 is FOD+TLD−Vr, and a potential difference, s12−s13, across the outer focusing coil 620 is FOD−TLD−Vr. Hence, the inner focusing coil 610 is driven by FOD+TLD−Vr, and the outer focusing coil 620 is driven by FOD−TLD−Vr.

If the value of the input signal TLD is 0, both the inner and outer focusing coils 610 and 620 are driven by FOD−Vr. Thus, the input signal FOD is a focusing signal. If the input signal TLD has a positive value, the OL is tilted toward the outer boundary of the disc. Thus, the input signal TLD is a tilt signal.

In general, the tilt signal is more often a low frequency signal than the focusing signal. Hence, both the focusing signal and the tilt signal can be applied to a single signal wire. In this case, current flowing into the signal wire 530 via the signal wire 510 is almost the same as current flowing into the signal wire 530 via the signal wire 520, and accordingly, little cross-talk occurs between the inner and outer focusing coils. Also, the tilt signal has a low frequency that is equal to or less than a disc rotating frequency, and accordingly, little cross-talk occurs between the tilt signal and the focusing signal.

The tracking coil signal production unit 420 produces a tracking signal s14 that is transmitted to a signal wire 540 connected to a starting port of the tracking coil 630, and a tracking signal s15 that is transmitted to a signal wire 550 connected to an ending port of the tracking coil 630.

The LC panel signal production unit 430 receives an LC control signal and produces signals v1, v2, and vc, which drive the LC panel 640.

FIG. 7 is a block diagram of the actuator 600 of FIG. 6 and an apparatus 400' that produces a driving signal for the actuator according to a third embodiment of the present invention. Referring to FIG. 7, the apparatus 400' includes the first and second signal producers 412 and 414 and a third signal producer 418.

A signal with the same magnitude and the opposite polarity as the input signal FOD is produced as a common reference signal s23, which is transmitted to both the inner and outer focusing coils 610 and 620. An OP amplifier with a gain of −1 is used in this embodiment to produce the common reference signal s23.

The inner coil signal s11=FOD+TLD, the outer coil signal s12=FOD−TLD, and the common reference signal s23=−FOD. A potential difference, s11−s23, across the inner focusing coil 610 is FOD+TLD−(−FOD)=2*FOD+TLD, and a potential difference, s12−s23, across the outer focusing coil 620 is FOD−TLD−(−FOD)=2*FOD−TLD.

When the apparatuses 400 and 400' receive an identical input signal FOD, the apparatus 400' provides a voltage and current twice as those produced by the apparatus 400 to the inner and outer focusing coils 610 and 620. Accordingly, the apparatus 400' can provide more power than the apparatus 400, even if both use an identical OP amplifier.

FIG. 8 is a block diagram of the actuator of FIG. 6 and an apparatus 400" that produces a driving signal for the actuator according to a fourth embodiment of the present invention. Referring to FIG. 8, the actuator-driving signal providing apparatus 400" includes first, second, and third signal producers 411, 413, and 415.

The first signal producer 411 receives an input signal $V_{11}$=FOD+TLD, in which a focusing signal and a tilt signal are mixed, and outputs a driving signal s31=$V_{11}$ to the signal wire 510 connected to the first port of the inner focusing coil 610.

The second signal producer 413 receives an input signal $V_{12}$=FOD−TLD, in which a focusing signal and a tilt signal are mixed, and outputs a driving signal s32=$V_{12}$ to the signal wire 520 connected to the first port of the outer focusing coil 620.

The third signal producer 415 outputs a driving signal s33 with the same magnitude and the opposite polarity as a signal $(V_{11}+V_{12})/2$ to the signal wire 530 connected to both the second port of the inner focusing coil 610 and the second port of the outer focusing coil 620.

The driving signal s31 is equal to the input signal $V_{11}$ and has a value of FOD+TLD. The driving signal s32 is equal to the input signal $V_{12}$ and has a value of FOD−TLD. The driving signal s33 is $-(V_{11}+V_{12})/2$=−FOD. A potential difference, s31−s33, across the inner focusing coil 610 is FOD+TLD−(−FOD)=2*FOD+TLD, and a potential difference, s32−s33, across the outer focusing coil 620 is FOD−TLD−(−FOD)=2*FOD−TLD.

The apparatus 400" can be used when an optical disk system receives a signal in which a focusing signal and a tilt signal are mixed. Also, the apparatus 400" can provide more power than the apparatus 400 even when both use an identical OP amplifier.

In the actuator of an optical disk system according to exemplary embodiments of the present invention and the apparatus that produces driving signals for the actuator, two signals are supplied to inner and outer focusing coils via a single connection wire. Thus, a simple, cheap 8-wire actuator can be obtained. An LC panel which compensates for a thickness deviation of a disc is installed in an operating unit of the actuator such that the LC panel can easily compensate for the disc thickness deviation.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. An actuator of an optical disk system, including a light source, recording and/or reproducing information from an optical disk surface, the actuator comprising:
   an inner focusing coil located near an inner boundary of the optical disk surface;
   an outer focusing coil located near an outer boundary of the optical disk surface;
   a first signal wire connected to a first port of the inner focusing coil, which transmits an inner coil signal;
   a second signal wire connected to a first port of the outer focusing coil, which transmits an outer coil signal; and
   a common signal wire connected to a second port of the inner focusing coil and a second port of the outer focusing coil, which transmits a common reference signal,
   wherein the inner coil signal is a sum of first and second signals, and the outer coil signal is a difference of the first and second signals and
   wherein the common reference signal has a same magnitude and an opposite polarity as the first signal.

2. The actuator of claim 1, wherein a sum of a focusing signal and a tilt signal is applied to the inner focusing coil and a signal obtained by subtracting the tilt signal from the focusing signal is applied to the outer focusing signal.

3. The actuator of claim 1, wherein the common reference signal has a ground voltage.

4. An actuator of an optical disk system, including a light source, recording and/or reproducing information from an optical disk surface, the actuator comprising:
   an inner focusing coil located near an inner boundary of the optical disk surface;
   an outer focusing coil located near an outer boundary of the optical disk surface;
   a first signal wire connected to a first port of the inner focusing coil, which transmits an inner coil signal;
   a second signal wire connected to a first port of the outer focusing coil, which transmits an outer coil signal; and
   a common signal wire connected to a second port of the inner focusing coil and a second port of the outer focusing coil, which transmits a variable common reference signal,
   wherein the inner coil signal is a first signal, the outer coil signal is a second signal, and the common reference signal has a same magnitude and an opposite polarity as a mean of the first and second signals.

5. The actuator of claim 1, further comprising a tracking coil which moves the actuator in a radial direction along the optical disk surface.

6. The actuator of claim 1, further comprising a liquid crystal panel which compensates for a thickness deviation of the optical disk surface.

7. An apparatus driving an actuator comprising:
   a first signal producer which produces an inner coil signal transmitted to a first port of an inner focusing coil of the actuator;
   a second signal producer which produces an outer coil signal transmitted to a first port of an outer focusing coil of the actuator; and
   a third signal producer which produces a common reference signal transmitted to both a second port of the inner focusing coil and a second port of the outer focusing coil,
   wherein the inner coil signal is a sum of first and second signals, and the outer coil signal is a difference of the first and second signals, and
   wherein the common reference signal has a same magnitude and an opposite polarity as the first signal.

8. The apparatus of claim 7, wherein a sum of a focusing signal and a tilt signal is applied to the inner focusing coil and a signal obtained by subtracting the tilt signal from the focusing signal is applied to the outer focusing signal.

9. The apparatus of claim 7, wherein the common reference signal has a ground voltage.

10. An apparatus driving an actuator comprising:
a first signal producer which produces an inner coil signal transmitted to a first port of an inner focusing coil of the actuator;
a second signal producer which produces an outer coil signal transmitted to a first port of an outer focusing coil of the actuator; and
a third signal producer which produces a common reference signal transmitted to both a second port of the inner focusing coil and a second port of the outer focusing coil,
wherein the inner coil signal is a first signal, the outer coil signal is a second signal, and the common reference signal has a same amplitude and an opposite polarity as a mean of the first and second signals.

11. The apparatus of claim 7, further comprising a tracking coil signal production unit which produces tracking signals that are transmitted to ports of a tracking coil of the actuator.

12. The apparatus of claim 7, further comprising a liquid crystal panel signal production unit which produces liquid crystal panel signals that are transmitted to ports of a liquid crystal panel of the actuator.

13. The apparatus of claim 12, wherein the liquid crystal panel signals comprise first and second driving signals and a common signal provided to the LC panel.

* * * * *